United States Patent
Phillips

(10) Patent No.: US 7,353,101 B2
(45) Date of Patent: Apr. 1, 2008

(54) METHODS AND APPARATUS TO CONTROL ELECTRO-MECHANICAL BRAKES

(75) Inventor: James Russell Phillips, South Bend, IN (US)

(73) Assignee: Honeywell International Inc., Morristown, NJ (US)

(*) Notice: Subject to any disclaimer, the term of this patent is extended or adjusted under 35 U.S.C. 154(b) by 0 days.

(21) Appl. No.: 11/405,957

(22) Filed: Apr. 18, 2006

(65) Prior Publication Data

US 2007/0244618 A1 Oct. 18, 2007

(51) Int. Cl.
*G06F 19/00* (2006.01)

(52) U.S. Cl. .................. 701/70; 188/156; 717/115; 303/20

(58) Field of Classification Search .............. 701/70; 188/156, 24.14
See application file for complete search history.

(56) References Cited

U.S. PATENT DOCUMENTS

| | | | |
|---|---|---|---|
| 4,543,638 A * | 9/1985 | Scarffe ............... | 700/245 |
| 4,995,483 A | 2/1991 | Moseley et al. | |
| 6,000,507 A | 12/1999 | Bohm et al. | |
| 6,003,640 A | 12/1999 | Ralea | |
| 6,183,051 B1 | 2/2001 | Hill et al. | |
| 6,279,694 B1 * | 8/2001 | Bohm et al. ............ | 188/162 |
| 6,367,597 B1 | 4/2002 | De Vries et al. | |
| 6,471,015 B1 * | 10/2002 | Ralea et al. ............ | 188/1.11 L |
| 6,536,562 B1 | 3/2003 | Böhm et al. | |
| 6,550,871 B1 | 4/2003 | Böhm et al. | |
| 6,662,906 B1 * | 12/2003 | Bohm et al. ............ | 188/1.11 E |
| 6,702,069 B2 * | 3/2004 | Ralea et al. ............ | 188/71.5 |
| 6,918,470 B2 | 7/2005 | Guaraldo | |
| 6,959,794 B2 | 11/2005 | Ralea et al. | |
| 2002/0026272 A1 * | 2/2002 | Yamamoto ............ | 701/70 |
| 2005/0082999 A1 | 4/2005 | Ether | |
| 2005/0109565 A1 * | 5/2005 | Ralea et al. ............ | 188/71.5 |
| 2005/0131613 A1 | 6/2005 | Bohm et al. | |
| 2005/0173980 A1 * | 8/2005 | Bohm et al. ............ | 303/155 |

* cited by examiner

*Primary Examiner*—Jack Keith
*Assistant Examiner*—Jonathan Goldfarb
(74) *Attorney, Agent, or Firm*—Birch, Stewart, Kolasch & Birch, LLP

(57) ABSTRACT

Methods and apparatus to control electro-mechanical brakes are disclosed. A disclosed example method of controlling a brake actuator comprises receiving a value representative of a velocity of a piston associated with the brake actuator relative to a pressure plate mounted on a wheel, and determining a control input for the brake actuator based on the velocity value.

5 Claims, 5 Drawing Sheets

METHODS AND APPARATUS TO CONTROL ELECTRO-MECHANICAL BRAKES

FIELD OF THE DISCLOSURE

This disclosure relates generally to electro-mechanical brakes and, more particularly, to methods and apparatus to control electro-mechanical brakes.

BACKGROUND

An electro-mechanical brake includes any variety of electrical actuator(s) controllable to apply a braking force to a rotating wheel. In response to, for example, a control input, an actuator moves an actuator piston face relative to a pressure plate. While the piston face and the pressure plate are not in contact, no braking force is applied. When the piston face is positioned to exert a force against the pressure plate, a corresponding braking force occurs.

Precise control and/or response times of electro-mechanical brakes are limited by any number and/or variety of static and/or dynamic parameters and/or effects such as brake stack stiffness, effective actuator rotor inertia, thermal expansion, etc. For example, an actuator may be designed to position the piston face at a particular distance from a pressure plate in response to a given control input value. However, due to thermal expansion of the piston face and/or the pressure plate, the actual separation distance between them may be greater than or less than the designed (i.e., intended) distance. Closed-loop control systems for electro-mechanical brakes may be used to improve control precision and/or response time, but currently rely on actuator position feedback provided by the brake via, for example, one or more position and/or contact sensors.

DETAILED DESCRIPTION

Figure 1:
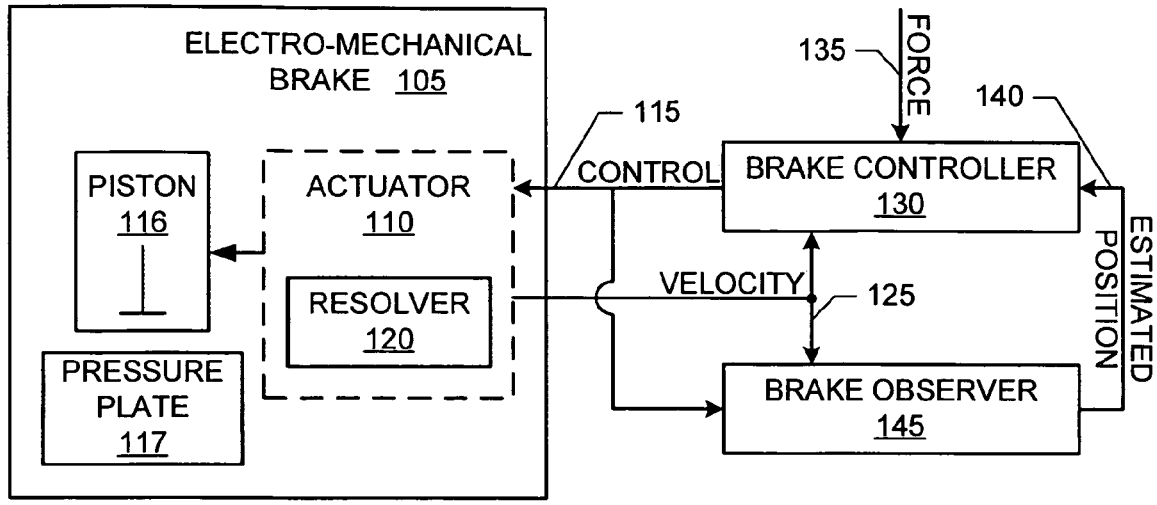
FIG. 1 is a schematic illustration of an example electro-mechanical brake control apparatus.

FIG. 1 is a schematic illustration of an example electro-mechanical brake control apparatus to control any variety of electro-mechanical brake 105 including, for example, a brake for an aircraft, a ground vehicle, a moving vehicle, a truck, a locomotive or other railed vehicle, etc. To exert a braking force, the example electro-mechanical brake 105 of FIG. 1 includes any variety of rotational actuator 110 such as, for example, a brushless direct current (DC) motor having a transmission with a given gear ratio and a ball screw with a given pitch, to convert angular rotation of the motor to linear displacement of the piston 116 relative to the pressure plate 117. The example actuator 110 of FIG. 1 has any variety of interface to accept a control input 115. In response to the control input 115, the example actuator 110 positions the face of any variety of piston 116 relative to any variety of pressure plate 117. As the control input 115 causes the face of the piston 116 to be pressed against the pressure plate 117 by the actuator 110, the electro-mechanical brake 105 applies a braking force to an associated movable (e.g., rotating) device (e.g., a wheel).

In the context of wheel braking, to measure the angular velocity of the actuator motor, the example actuator 110 of FIG. 1 includes any variety of resolver 120. In the illustrated example of FIG. 1, the resolver 120 provides an output signal 125 representative of the current linear velocity of the piston 116 relative to the pressure plate 117. It accomplishes this by measuring the angular velocity of the actuator motor, and then applying a scale factor that represents the mechanical action of the motor transmission thus converting angular velocity to linear velocity.

While an example electro-mechanical brake 105 is illustrated in FIG. 1, it will be readily appreciated by persons of ordinary skill in the art that the methods and apparatus to control an electro-mechanical brake disclosed herein may be applied to other varieties of electro-mechanical brake. For example, the disclosed methods and apparatus may be used to control an electro-mechanical brake having more than one actuator. For instance, global (i.e., overall) stack stiffness of an electro-mechanical brake could be allocated across a plurality of actuators with each of the actuators controlled independently by an associated brake controller. Such a plurality of actuators could be controlled by a single brake controller and/or by multiple coordinated controllers. For simplicity and ease of understanding, the following discussion references the example electro-mechanical brake 105 of FIG. 1 which is operable to substantially service a rotateable wheel against movement, but any electro-mechanical brake accepting a control input 115 and providing a velocity output 125 may also be used.

To control the example electro-mechanical brake 105, the example brake control apparatus of FIG. 1 includes a brake controller 130. Based upon an input signal 135 representative of a desired braking force, the example brake controller 130 of FIG. 1 determines the value of the control input 115 for the actuator 110. The desired braking force 135 may be provided by, for example, any variety of transducer associated with a brake lever, a brake pedal, etc. As the brake force input signal 135 changes, the brake controller 130 accordingly adjusts the value of the control input 115. The example brake controller 130 also adapts the control input 115 in response to a velocity signal 125 and an estimated position signal 140. In the illustrated example of FIG. 1, the estimated position signal 140 represents an estimate of the position of the face of the piston 116 relative to the corresponding pressure plate 117. The example brake controller 130 of FIG. 1 may be implemented using any variety of hardware (e.g., devices, circuits, logic elements, etc.) and/or may be implemented using software, firmware and/or any combination of hardware, software and/or firmware.

Example manners of implementing the example brake controller 130 are discussed below in connection with FIGS. 4, 6 and 8.

To determine the estimated position signal 140, the example apparatus of FIG. 1 includes a brake observer 145. Based upon the velocity signal 125, the example brake observer 145 of FIG. 1 computes and/or otherwise determines the estimated position 140. The example brake observer 145 of FIG. 1 may be implemented using any variety of hardware (e.g., devices, circuits, logic elements, etc.) and/or may be implemented using software, firmware and/or any combination of hardware, software and/or firmware. Example manners of implementing the example brake observer 145 are discussed below in connection with FIGS. 3, 5 and 7.

Figure 2:
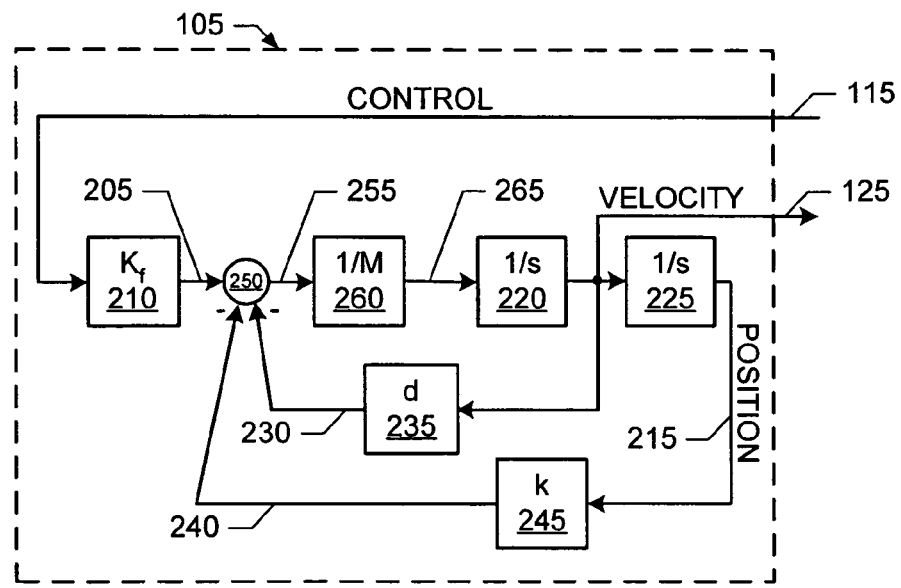
FIG. 2 is a schematic illustration of an example model of the example electro-mechanical brake of FIG. 1.

FIG. 2 is a schematic illustration of an example model of the example electro-mechanical brake 105 of FIG. 1. In the example of FIG. 2, the control input 115 is an electrical current i. The control input 115 is converted to equivalent units of output force 205 by passing it through a force gain $K_f$ 210. To determine the velocity $\dot{x}$ 125 and an actuator position x 215, the example model of FIG. 2 includes two integrators 220 and 225, respectively. An output of the first integrator 220 is used to compute a load force 230 by passing it through a damping gain d 235 (e.g., an amplifier). Likewise, an output of the second integrator 225 is used to compute a second load force 240 by passing it through a load stiffness gain k 245 (e.g., an amplifier). In the example of FIG. 2, the load force signal 240 represents the actual force between the actuator piston 116 and the pressure plate 117. The difference between the desired braking force 205 and a sum of the load forces 230 and 240 represents the net force acting to accelerate the equivalent lumped mass M of the actuator rotor and drive train. In the example model of FIG. 2, this net force is the output 255 of a summing junction 250. In the illustrated example, the net force 255 is scaled by passing it through an equivalent rotor mass M 260 (e.g., an amplifier) to produce a rotor acceleration signal 265. The rotor acceleration signal 265 is then integrated by the first integrator 220 to determine the velocity signal $\dot{x}$ 125. The velocity signal $\dot{x}$ 125 is integrated by the second integrator 225 to obtain the position signal x 215.

The example electro-mechanical brake model 105 of FIG. 2 can, additionally or alternatively, be modeled mathematically as $$\dot{x} = Ax + Bi,$$

$$y = Cx \quad\quad\quad \text{EQN (1)}$$

where $$x = [x, \dot{x}]', \quad A = \begin{bmatrix} 0 & 1 \\ -k/M & -d/M \end{bmatrix}, \quad\quad \text{EQN (2)}$$

$$B = \begin{bmatrix} 0 \\ K_f/M \end{bmatrix}, \text{ and } C = [0 \; 1].$$

While an example model of the example electro-mechanical brake 105 of FIG. 1 is illustrated in FIG. 2 and expressed mathematically in EQN (1) and EQN (2), persons of ordinary skill in the art will readily appreciate that there are many varieties of additional and/or alternative models for electro-mechanical brakes that have a control input and provide an output that is representative of a velocity. For example, a model of an electro-mechanical brake could, additionally or alternatively, include any variety of non-linear effects such as, for example, a load-dependent friction, a motor load to speed non-linearity, etc. Further, while the example manners of implementing the example brake observer 145 and the example brake controller 130 of FIG. 1 discussed below in connection with FIGS. 3-6 correspond to the example model of FIG. 2 and the mathematically expressions of EQN (1) and EQN (2), persons of ordinary skill in the art will also appreciate that alternative and/or additional manners of implementing the example brake observer 145 and/or the example brake controller 130 may be readily designed to correspond to any additional and/or alternative brake model. An example brake observer 145 and an example brake controller 130 to control an electro-mechanical brake having a non-linearity are discussed below in connection with FIGS. 7 and 8, respectively.

Figure 3:
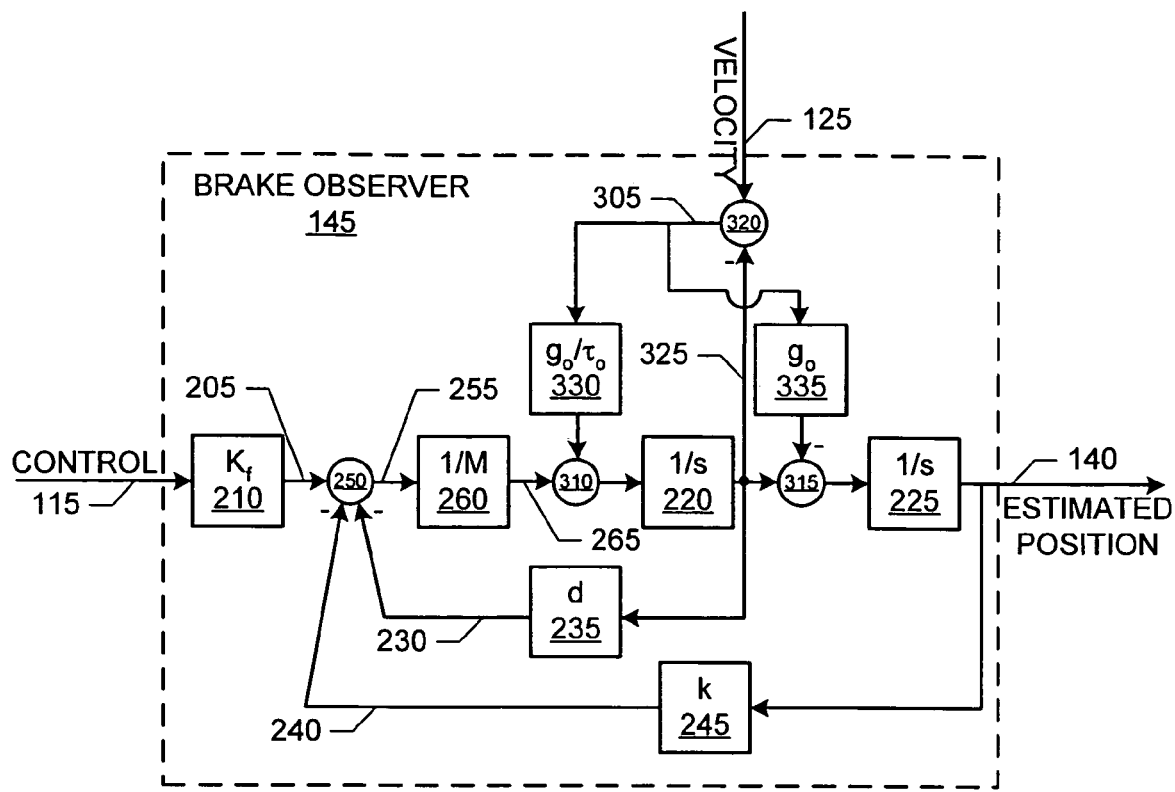
FIG. 3 is an example manner of implementing the example brake observer of FIG. 1.

FIG. 3 illustrates an example manner of implementing the example brake observer 145 of FIG. 1. The implementation and/or interconnection of the example elements of FIG. 3 are substantially the same as shown and described above in conjunction with FIG. 2 and, thus, in the interest of brevity, the description of identical portions of FIG. 2 will not be repeated here. Instead, the interested reader is referred back to the corresponding description of FIG. 2. To facilitate this process, like elements have been numbered with like reference numerals in FIGS. 2 and 3.

To feed back an error signal 305, the example brake observer 145 of FIG. 3 includes a first summing junction 310 at the input to the first integrator 220 and a second summing junction 315 at the input to the second integrator 225. To compute the error 305, the example observer includes a summing junction 320 that computes a difference between the actual velocity signal 125 provided by the electro-mechanical brake 105 via any variety of means and an estimated velocity 325 output by the integrator 220. In the example of FIG. 3, the output of the summing junction 310 is integrated by the first integrator 220 to determine a signal 325 representative of the estimated linear velocity of face of the piston 116 relative to the pressure plate 117. Likewise, the output of the summing junction 315 is integrated by the second integrator 225 to obtain a signal 140 representative of the estimated position of the face of the piston 116 relative to an associated pressure plate 117.

To control convergence of the example brake observer 145 of FIG. 3, the example brake observer 145 includes a gain 330 having a value of $g_o/\tau_o$ and a gain 335 having a value of $g_o$. In the example of FIG. 3, the values of $g_o$ and $\tau_o$ are chosen using root-locus principles. In particular, the characteristic polynomial for the example brake observer 145 of FIG. 3 can be mathematically expressed as $$s^2 + s\left(\frac{d}{M} + \frac{g_o}{\tau_o}\right) + \frac{k}{M}(1 + g_o). \quad\quad \text{EQN (3)}$$

The following mathematical expression is obtained if the mathematical expression of EQN (3) is set equal to zero and then re-written into a standard root-locus form $$\frac{g_o\left(\frac{s}{\tau_o} + \frac{k}{M}\right)}{s^2 + s\frac{d}{M} + \frac{k}{M}} = -1. \quad\quad \text{EQN (4)}$$

The poles of the example brake observer 145 are determined by the denominator of the left-hand side of EQN (4), while a zero of the example brake observer 145 is determined by the numerator of the left-hand side of EQN (4). In particular, as the value of $g_o$ increases, a first one of the open-loop poles moves in the s-plane along the real axis towards negative infinity, while a second open-loop pole approaches the zero of the example brake observer 145. In particular, the second pole moves toward $$-s = \omega_0 = \frac{\tau_0 k}{M} \qquad \text{EQN (5)}$$

If the value of $g_o$ is set high enough, the response of the example brake observer 145 of FIG. 3 is dominated by a single pole near $s=-\omega_o$ and, thus, the necessary time constant $\tau_o$ can be mathematically expressed as $$\tau_0 = \frac{\omega_0 M}{k}, \qquad \text{EQN (6)}$$

where $\omega_o$ is a constant used to control the convergence of the example brake observer 145. For the example brake observer 145 of FIG. 3, the poles can be interpreted as the eigenvalues of the estimation errors 305. So that the estimation errors 305 converge at least as fast as the eigenvalues of the example model of FIG. 2, in the illustrated example of FIG. 3 the value of the constant $\omega_o$ is set in the range of 30 to 60 radians per second, and the value of $g_o$ is selected to control the transient response time of the brake observer 145. An example value of $g_o$ is 10.

While an example brake observer 145 is illustrated in FIG. 3, persons of ordinary skill in the art will readily appreciate that a brake observer could include any variety of additional and/or alternative elements such as, for example, any variety of non-linear element to compensate for, for example, a load-dependent friction in an electro-mechanical brake. An alternative brake observer 145 that includes a non-linear element is discussed below in connection with FIG. 7.

The example integrator 220 of FIG. 3 can be initialized to zero as it quickly converges to the correct value. Initialization of the example integrator 225 of FIG. 3 depends upon the current operational mode of the electro-mechanical brake 105. In particular, when the piston 116 of the example actuator 110 is at full retraction to its hard stop, the estimated position 140 (i.e., the value of the integrator 225) should be initialized to a negative value that reflects the nominal distance from the pressure plate 117 to the hard stop. For recovery from, for example, a loss of power during braking, the value of the estimated position 140 should be set (upon power recovery) to a safe value that ensures convergence of the estimated position 140 to its true value as braking continues. The safe value depends upon the physical characteristics of the particular electro-mechanical brake 105 and/or the actuator 110 being observed by the brake observer 145, and may be determined via, for example, simulation, detailed system modeling, lab testing and/or field testing.

Figure 4:
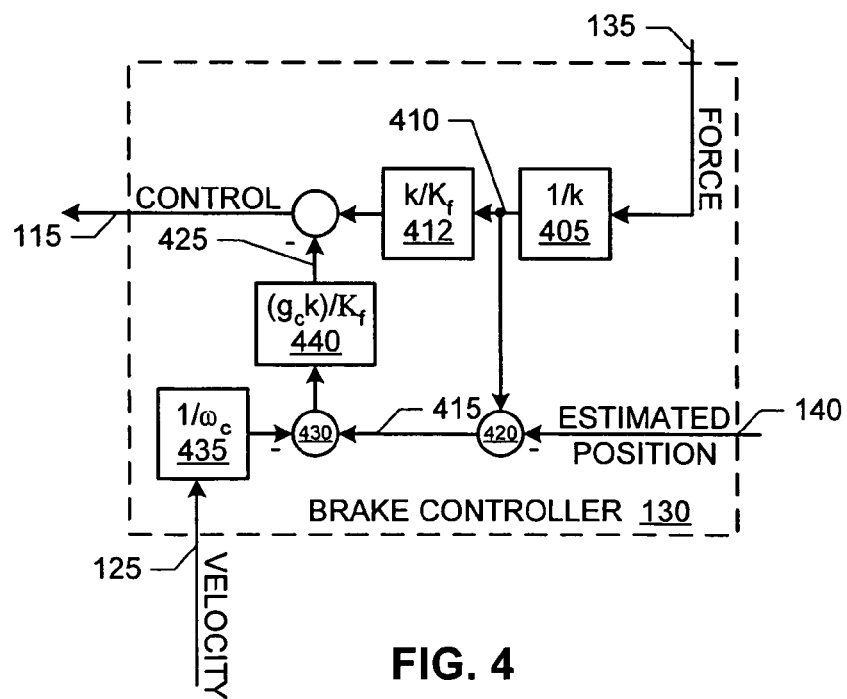
FIG. 4 is an example manner of implementing the example brake controller of FIG. 1.

FIG. 4 is an example manner of implementing the example brake controller 130 of FIG. 1. The example brake controller 130 of FIG. 4 scales the force input value 135 with a gain 405 having a value of 1 over the load stiffness gain k 245 (FIG. 2) to generate a position command value 410. To scale the position command value 410, the example brake controller 130 of FIG. 3 includes a gain 412 having a value of the load stiffness coefficient k 245 divided by the force gain $K_f$ 210 (FIG. 2).

To compute a position error 415, the example brake controller 130 of FIG. 4 includes a summing junction 420. The example summing junction 420 subtracts the estimated position value 140 from the position command value 410. To compute a transient correction value 425, the example brake controller 130 of FIG. 4 includes another summing junction 430 and gains 435 and 440. The gain 435 has a value of $1/\omega_c$ and is used to scale the value of the velocity 125. The scaled velocity is subtracted from the position error value 415 by the summing junction 430. The output of the summing junction 430 is scaled by a gain 440 having a value of $g_c k/K_f$, where $g_c$ is the gain of the example brake controller 130. The output of the gain 44 is then subtracted from the scaled position command value 410 (i.e., the output of the gain 412) to form the value of the control input 115.

In the example brake controller 130 of FIG. 4, the transient correction value 425 is a rate command value based on the position error value 415. In the illustrated example of FIG. 4, the controller bandwidth parameter $\omega_c$ scales the position error value 415 into the transient correction or rate command value 425. In the illustrated example, the value of the controller gain $g_c$ is chosen to be reasonably large so that the electro-mechanical brake 105 follows the brake controller 130 closely. In fact, as the value of $g_c$ is increased, one of the poles of the example brake controller 130 moves toward infinity along the negative real axis and the second pole closely approaches a closed-loop zero at $s=-\omega_c$. In the illustrated example of FIG. 4 the value of the constant $\omega_c$ is set in the range of 30 to 60 radians per second. In the illustrated example of FIGS. 1, 3 and 4, the values of $\omega_c$ and $\omega_o$ are chosen to be substantially equal. An example value of $g_c$ is 10. In the example of FIGS. 1, 3 and 4, the values selected for gains $g_c$ and $g_o$ enable the example brake controller 130 and the example brake observer 145 to be substantially independent of damping and/or friction in the electro-mechanical brake.

In operation, the position command signal 410 represents the steady-state value necessary to command an electro-mechanical brake to achieve a desired steady-state force 135. The transient correction signal 425 represents a necessary and/or beneficial control value adjustment that allows the electro-mechanical brake to reach the desired steady-state force more quickly. As the example brake controller 130 adapts, the transient correction 425 decays to zero as the desired steady-state force is achieved. For example, the transient correction signal 425 will quickly back-drive an electro-mechanical brake for decreasing force commands 135 during, for example, an anti-skid operation and/or maneuver. Alternatively or additionally, the transient correction signal 425 will overcome friction in the drive train of an actuator, thus realizing a more linear input/output characteristic for the electro-mechanical brake.

The gains illustrated in FIGS. 2, 3 and 4 may be implemented using, for example, any variety of amplifier such as an op-amp, etc. While not included in the example brake controller 130 of FIG. 4, a brake controller could, alternatively or additionally, include any variety of integral compensation in the transient correction path to help control the closed-loop design bandwidth. However, in the example of FIG. 4, the choice of the control parameter $\omega_c$ and the gain $g_c$ are used to control the closed-loop bandwidth.

Figure 5:
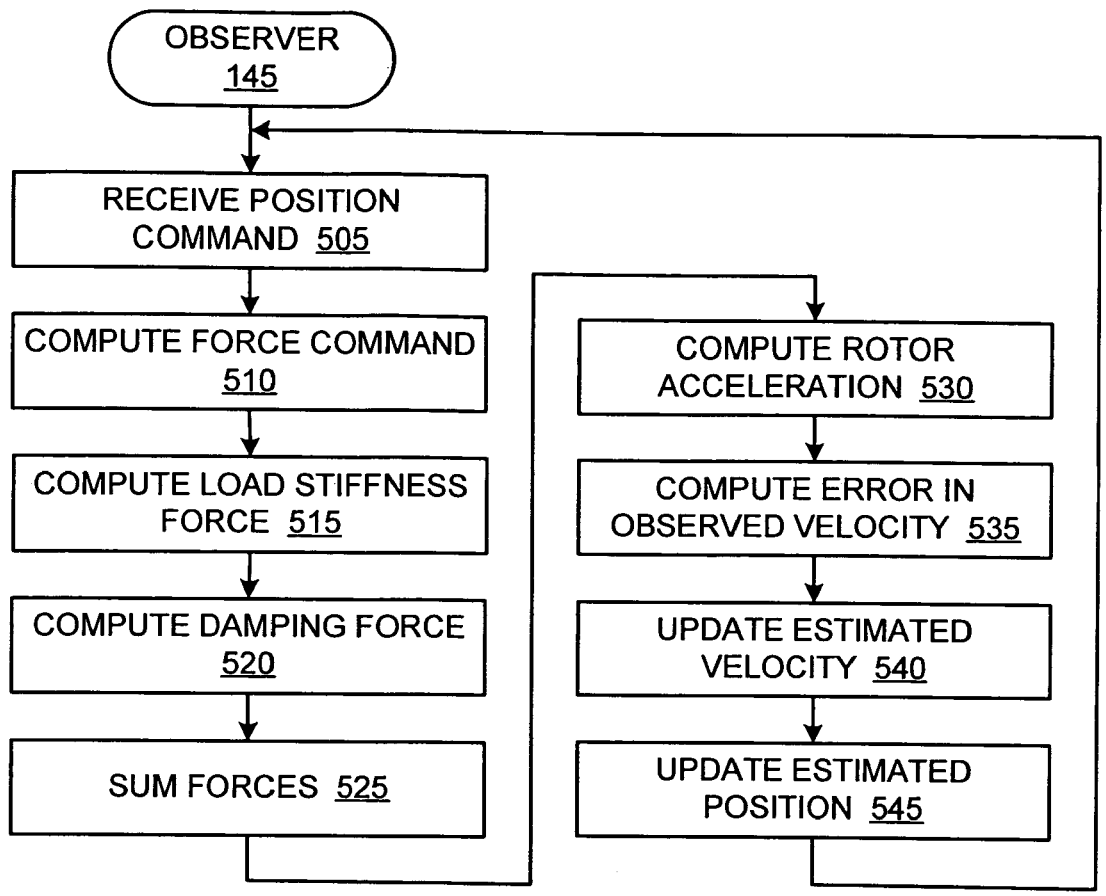
FIG. 5 is a flowchart representative of example machine accessible instructions which may be executed to implement the example brake observer of FIG. 1.
Figure 6:
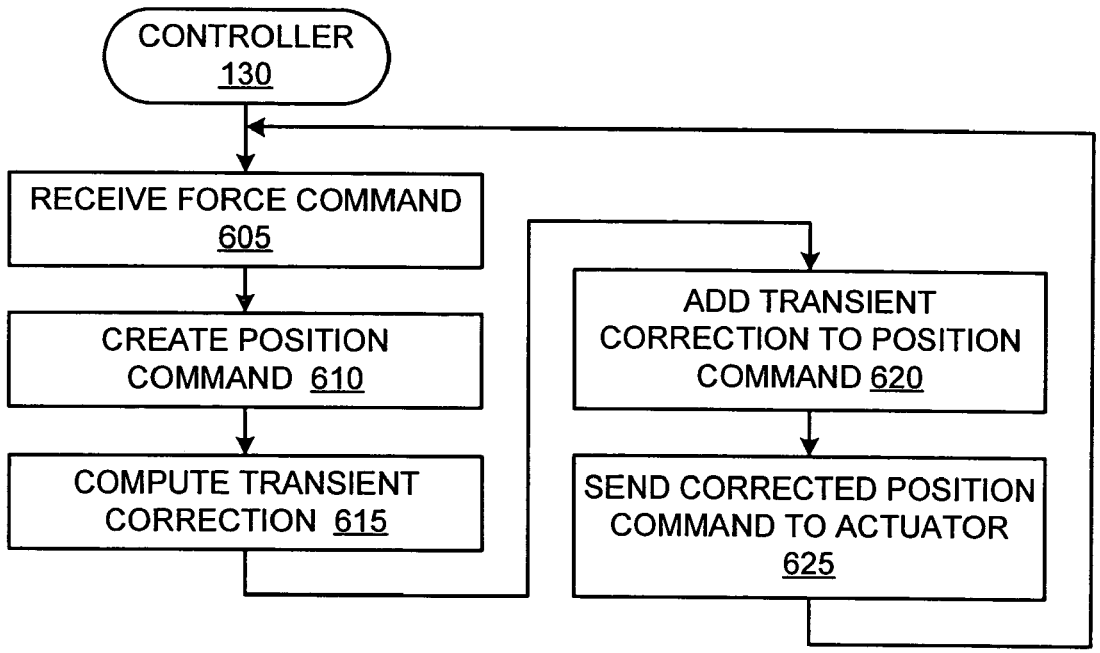
FIG. 6 is a flowchart representative of example machine accessible instructions which may be executed to implement the example brake controller of FIG. 1.

FIGS. 5 and 6 are flowcharts representative of example machine accessible instructions that may be executed to implement the example brake observer 145 and the example brake controller 130, respectively, and/or, more generally, to control the example electro-mechanical brake 105 of FIG. 1. The example machine accessible instructions of FIGS. 5 and 6 may be executed by a processor, a core, a controller and/or any other suitable processing device. For example, the example machine accessible instructions of FIGS. 5 and 6 may be embodied in coded instructions stored on a tangible medium such as a flash memory, or random access memory (RAM) associated with a processor (e.g., the processor 905 shown in the example processor platform 900 and discussed below in conjunction with FIG. 9). Alternatively, some or all of the example flowcharts of FIGS. 5 and 6 may be implemented using an application specific integrated circuit (ASIC), a programmable logic device (PLD), a field programmable logic device (FPLD), discrete logic, hardware, firmware, etc. Also, some or all of the example flowcharts of FIGS. 5 and 6 may be implemented manually or as combination(s) of any of the foregoing techniques, for example, a combination of firmware, software and/or hardware. Further, although the example machine accessible instructions of FIGS. 5 and 6 are described with reference to the flowcharts of FIGS. 5 and 6, persons of ordinary skill in the art will readily appreciate that many other methods of implementing the example brake observer 145, the example brake controller 130 and/or, more generally, to control the example electro-mechanical brake 105 of FIG. 1 may be employed. For example, the order of execution of the blocks may be changed, and/or some of the blocks described may be changed, eliminated, sub-divided, or combined. Additionally, persons of ordinary skill in the art will appreciate that the example machine accessible instructions of FIGS. 5 and 6 may be carried out sequentially and/or carried out in parallel by, for example, separate processing threads, processors, devices, circuits, etc.

The example machine accessible instructions of FIG. 5 begin with the brake observer 145 receiving a value of a position command signal 115 (block 505). As described above in connection with FIGS. 2 and 3, the brake observer 145 computes a force command value 205 (block 510), and computes a load stiffness force value 240 (block 515) and a damping force value 230 (block 520). The brake observer 145 then sums the force values 205, 230 and 240 (block 525). Next, the brake observer 145 scales the summed force value 255 to determine a rotor acceleration value 265 (block 530).

The brake observer 145 computes a difference or velocity error 305 between the observed velocity 125 and a previously estimated velocity 325 (block 535). The velocity error 305 is scaled and added to the rotor acceleration, and the updated rotor acceleration is integrated to compute an updated estimated velocity 325 (block 540). The velocity error value 305 is scaled again and added to the updated estimated velocity value 325, and the updated estimated velocity value 325 is integrated to compute an updated estimated position 140 (block 545). Control then returns to block 505 to receive the next value of the position command signal 115.

The example machine accessible instructions of FIG. 6 begin with brake controller 130 receiving a force command value 135 (block 605). The brake controller 130 scales the force command value 135 to determine a position command value 410 (block 610).

As described above in connection with FIG. 4, the brake controller 130 computes a transient correction value 425 by subtracting the estimated position command value 140 from the position command value 410 to form a position error value 415, subtracting a scaled version of the velocity value 125 from the position error value 415, and then scaling the resulting difference (block 615). The transient correction 425 is then subtracted from the position command value 410 (block 620) and the resulting value of the control input 115 is send to the actuator (block 625). Control then returns to block 605 to receive the next force command value 135.

Figure 7:
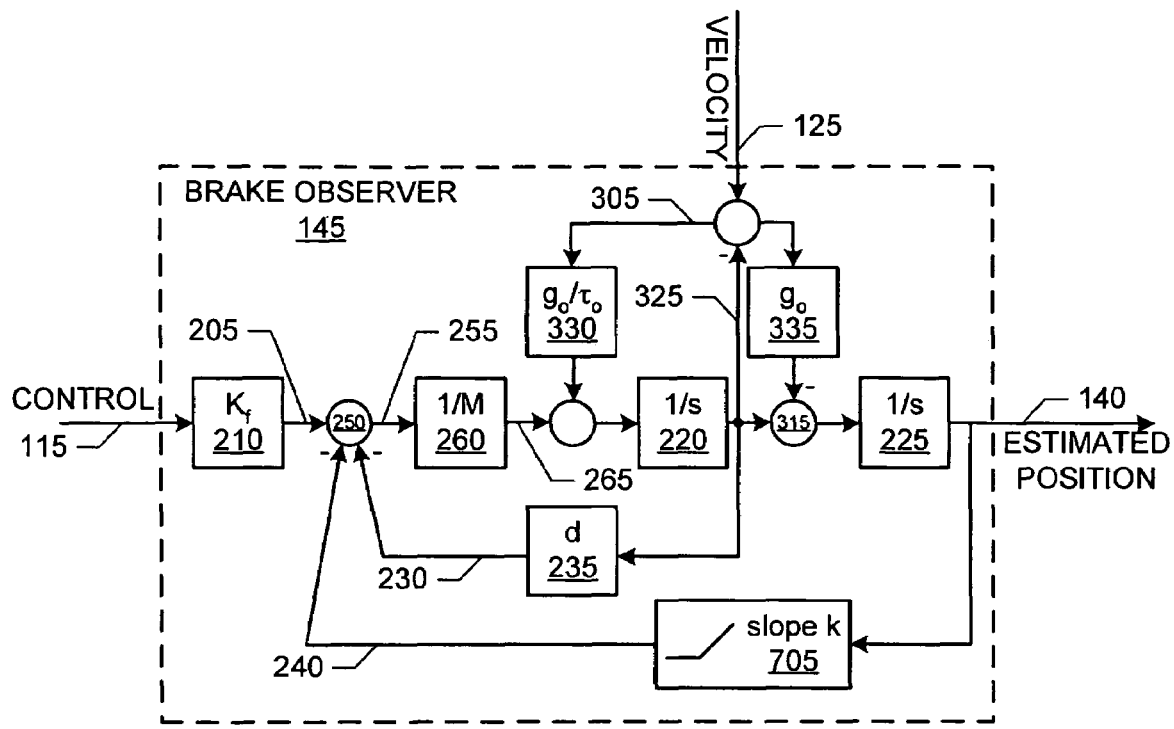
FIG. 7 is another example manner of implementing the example brake observer of FIG. 1.
Figure 8:
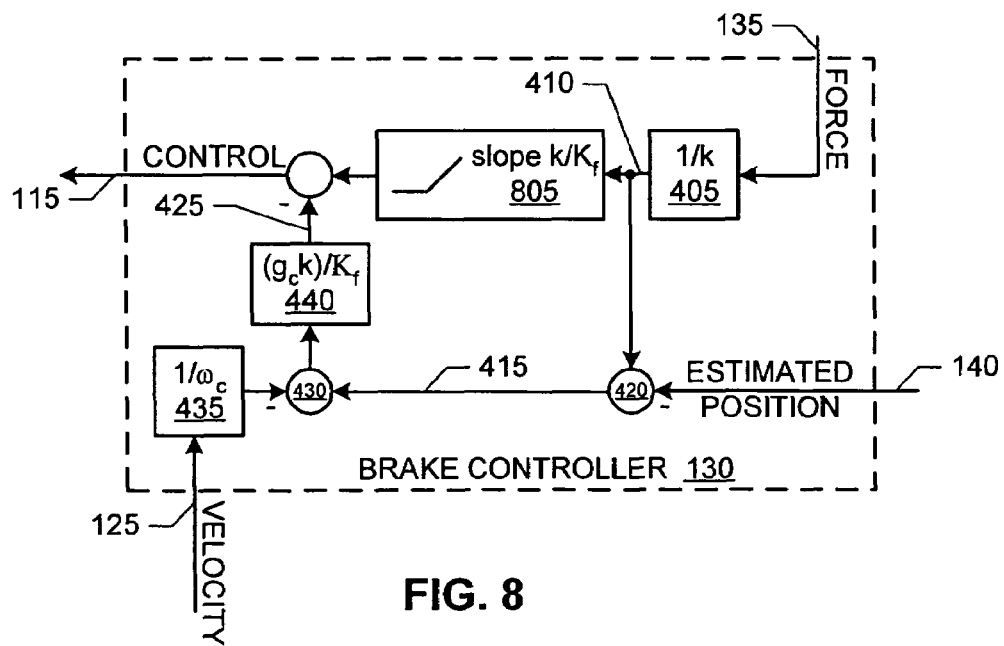
FIG. 8 is another example manner of implementing the example brake controller of FIG. 1.

FIGS. 7 and 8 illustrate other example manners of implementing the example brake observer 145 and the example brake controller 130, respectively, that support, for example, step-back of the actuator 110 and/or a closing of the running clearance between a piston face 116 and a pressure plate 117.

The implementation and/or interconnection of elements of FIG. 7 are substantially the same as shown and described above in conjunction with FIGS. 2 and/or 3 and, thus, in the interest of brevity, the description of identical portions of FIGS. 2 and/or 3 will not be repeated here. Instead, the interested reader is referred back to the corresponding description of FIGS. 2 and/or 3. To facilitate this process, like elements have been numbered with like reference numerals in FIGS. 2, 3 and 7.

In the example brake observer 145 of FIG. 7, the gain 245 of FIG. 3 is replaced with a non-linear gain 705. The example non-linear gain 705 of FIG. 7 results in a zero output for negative valued estimated positions 140 and results in outputs equal to k times the input for positive valued estimated positions 140. The example brake observer 145 of FIG. 7 extrapolates position from the velocity 125 when the estimated position 140 is less than zero. When the face of the piston 116 comes into contact with a pressure plate 117 (i.e., a position greater than or equal to zero), the brake observer 145 correctly tracks drifting of the piston 116 and/or the pressure plate 117 and/or tracks thermal expansion of the piston 116 and/or the pressure plate 117.

The implementation and/or interconnection of the elements of FIG. 8 are substantially the same as shown and described above in conjunction with FIG. 4 and, thus, in the interest of brevity, the description of identical portions of FIG. 4 will not be repeated here. Instead, the interested reader is referred back to the corresponding description of FIG. 4. To facilitate this process, like elements have been numbered with like reference numerals in FIGS. 4 and 8.

In the example brake controller 130 of FIG. 8 the gain 412 of FIG. 4 is replaced with a non-linear gain 805. The example non-linear gain 805 results in a zero output for negative valued position commands 410 and outputs equal to $k/K_f$ times the input for positive valued position commands 410. The example brake controller 130 of FIG. 8 only computes transient corrections 425 for negative valued position commands 410 since there is no requirement to hold the face of the piston 116 in contact with a pressure plate 117 for negative value force commands 135. In the example brake controller 130 of FIG. 8 it may be, alternatively or additionally, desirable to limit the value of the position error 415 to limit the control 115 when the actuator 110 is retracted near its hard stop.

Figure 9:
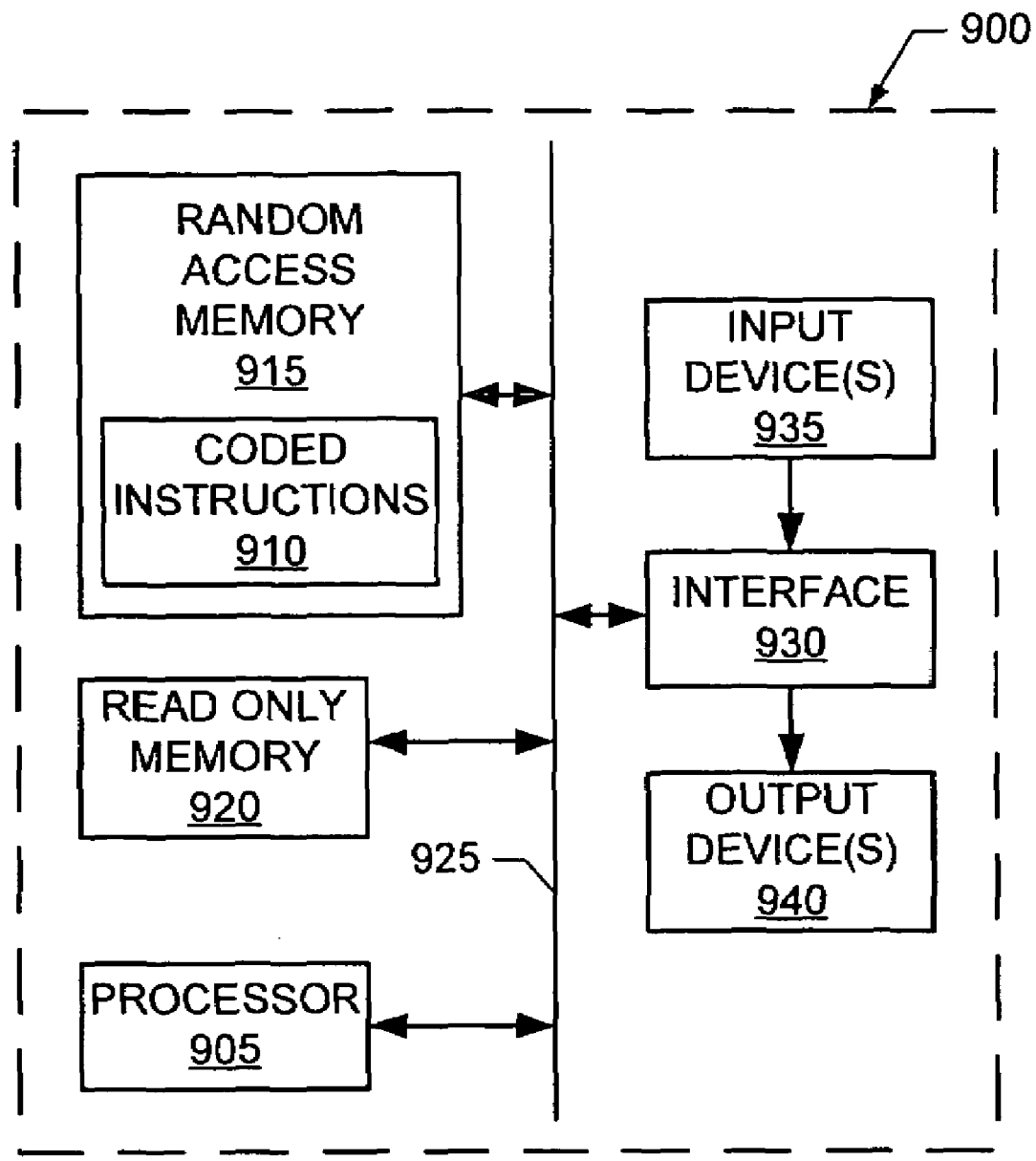
FIG. 9 is a schematic illustration of an example processor platform that may be used and/or programmed to execute the example machine accessible instructions illustrated in FIGS. 5 and 6 to implement the example brake observer and the example brake controller and/or, more generally, to control the example electro-mechanical brake of FIG. 1.

FIG. 9 is a schematic diagram of an example processor platform 900 that may be used and/or programmed to implement the example brake observer 145, the example brake controller 130 and/or, more generally, to control the example electro-mechanical brake 105 of FIG. 1. For example, the processor platform 900 can be implemented by one or more general purpose processors, cores, microcontrollers, etc.

The processor platform 900 of the example of FIG. 9 includes a general purpose programmable processor 905. The processor 905 executes coded instructions 910 present in main memory of the processor 905 (e.g., within a RAM 915). The processor 905 may be any type of processing unit, such as a processor from the AMD®, Sun®, IBM®, or Intel® families of processors. The processor 905 may execute, among other things, the example machine accessible instructions of FIGS. 5 and/or 6 to implement the example brake observer 145, the example brake controller 130 and/or, more generally, to control the example electromechanical brake 105 of FIG. 1.

The processor 905 is in communication with the main memory (including a read only memory (ROM) 920 and the RAM 915) via a bus 925. The RAM 915 may be implemented by dynamic random access memory (DRAM), Synchronous DRAM (SDRAM), and/or any other type of RAM device, and the ROM 920 may be implemented by flash memory and/or any other desired type of memory device. Access to the memories 915 and 920 is typically controlled by a memory controller (not shown) in a conventional manner.

The processor platform 900 also includes a conventional interface circuit 930. The interface circuit 930 may be implemented by any type of well-known interface standard, such as an external memory interface, serial port, general purpose input/output, etc.

One or more input devices 935 and one or more output devices 940 are connected to the interface circuit 930. For example, an input device 935 may be used to provide the control signal 115 (FIG. 1) and an output device 940 may be used to receive the velocity signal 125.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method of controlling a brake actuator having a piston to contact a brake member without determining an absolute position of the piston or the brake member, by utilizing a velocity of the piston relative to the brake member which has a non-constant contact position relative to the piston, comprising:

receiving a velocity signal representative of a velocity of a piston associated with a brake actuator relative to a brake member for a wheel;

determining continuously an estimated velocity signal of the piston relative to the brake member;

determining a difference between the received velocity signal and the estimated velocity signal;

updating continuously the estimated velocity signal based on the difference;

determining an estimated position signal representative of an estimated position of the piston relative to the brake member based on the updated estimated velocity signal; and combining the received velocity signal and the estimated position signal of the piston to determine a control input signal to adjust a force applied by the brake actuator to brake the wheel.

2. A method as defined in claim 1, wherein the control input signal is used to adjust a position of the piston of the brake actuator for a thermal effect.

3. A method as defined in claim 1, further comprising:

receiving a force signal representative of a desired force to be applied by the brake actuator to brake the wheel;

computing a position transient correction signal based on the received velocity signal, the force signal, and the estimated position signal of the piston of the brake actuator; and combining the force signal and the position transient correction signal to determine the control input signal.

4. A method as defined in claim 1, wherein the velocity signal is representative of at least one of an angular velocity or a linear velocity.

5. A method as defined in claim 1, further comprising:

receiving a force signal representative of a desired force to be applied by the brake actuator to brake the wheel;

changing the force signal to a position command signal;

computing a position transient correction signal based on the received velocity signal, the position command signal, and the estimated position signal of the piston of the brake actuator; and combining the position command signal and the position transient correction signal to determine the control input signal.

* * * * *